US011978197B2

(12) United States Patent
Sessinghaus et al.

(10) Patent No.: US 11,978,197 B2
(45) Date of Patent: May 7, 2024

(54) INSPECTION METHOD FOR INSPECTING AN OBJECT AND MACHINE VISION SYSTEM

(71) Applicant: Hilti Aktiengesellschaft, Schaan (LI)

(72) Inventors: Nadine Sessinghaus, Feldkirch (AT); Michael Helmberger, Bludenz (AT); Alex Conway, Cape Town (ZA)

(73) Assignee: Hilti Aktiengesellschaft, Schaan (LI)

( * ) Notice: Subject to any disclaimer, the term of this patent is extended or adjusted under 35 U.S.C. 154(b) by 384 days.

(21) Appl. No.: 17/512,823

(22) Filed: Oct. 28, 2021

(65) Prior Publication Data
US 2023/0138821 A1 May 4, 2023

(51) Int. Cl.
*G06T 7/00* (2017.01)
*G06N 3/04* (2023.01)
(52) U.S. Cl.
CPC ............ *G06T 7/001* (2013.01); *G06N 3/04* (2013.01); *G06T 7/0008* (2013.01); *G06T 2207/30164* (2013.01); *G06T 2207/30204* (2013.01)
(58) Field of Classification Search
CPC ... G01B 11/022; B23K 31/125; G06T 1/0007; G06T 7/001; G06Q 20/4016; G07C 13/00; G06N 3/04; G05D 1/0214; G06K 9/6202; G06K 9/00208
See application file for complete search history.

(56) References Cited

U.S. PATENT DOCUMENTS 11,216,663 B1* 1/2022 Ettinger ............... G05D 1/0016
2017/0345143 A1* 11/2017 Codella ................ G06T 7/0012

OTHER PUBLICATIONS

Abidi et al., "Operator Assisted Threat Assessment for Carry-On Luggage Inspection", 3rd International Aviation Security Technology Symposium, Atlantic City, NJ, Nov. 2001, pp. 1-7.
Zhao et al., "A mask R-CNN based method for inspecting cable brackets in aircraft", Chinese Journal of Aeronautics, vol. 34, No. 12, Oct. 14, 2020, 13 pages.

* cited by examiner

*Primary Examiner* — Phuoc H Doan
(74) *Attorney, Agent, or Firm* — Grüneberg and Myers PLLC

(57) ABSTRACT

An inspection method includes comparing an inspection image of an inspection object to a reference image of a reference object, recognizing at least one inspection part in the inspection image and at least one reference part in the reference image, wherein the inspection part and the reference part correspond to each other, registering the inspection image onto the reference image using the inspection part and the reference part and providing a set of registration data, and checking for at least one error using the inspection image, the reference image, and the set of registration data.

25 Claims, 11 Drawing Sheets

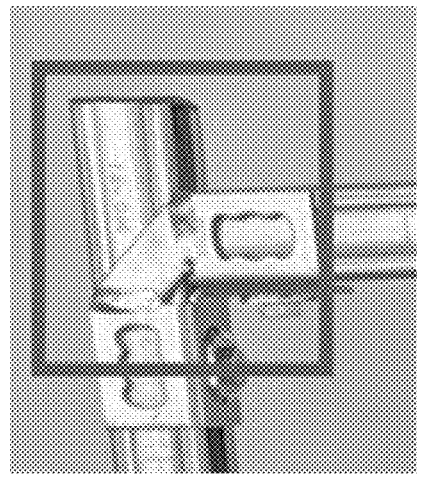
Fig. 9
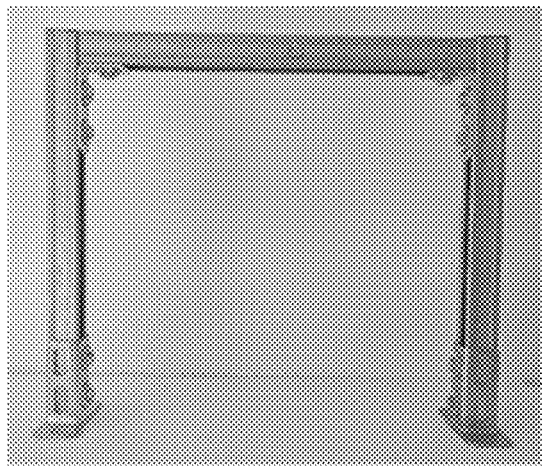 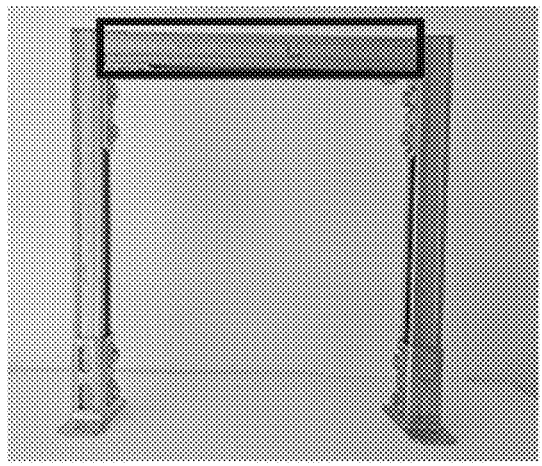
Fig. 10A Fig. 10B

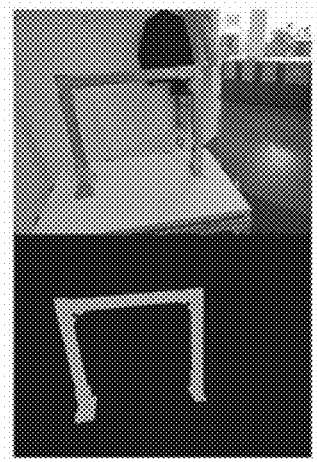  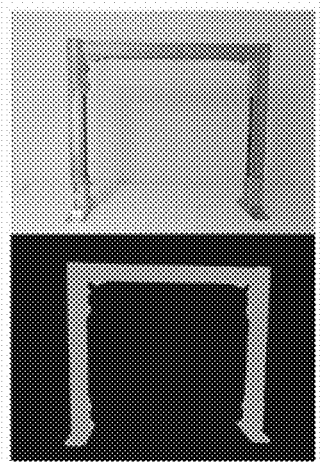
Fig. 13A  Fig. 13B  Fig. 13C
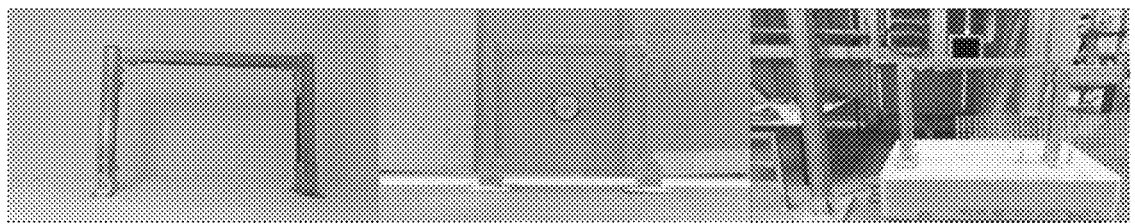
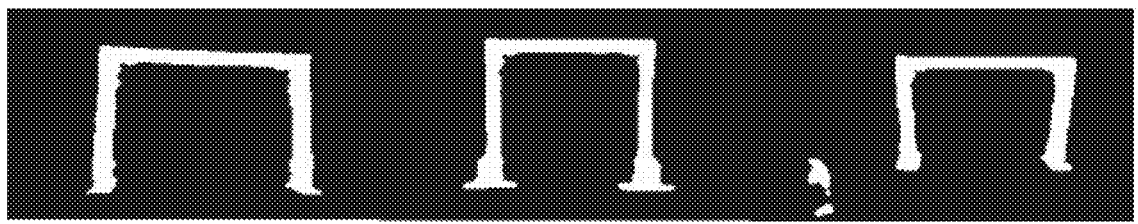
Fig. 14A  Fig. 14B  Fig. 14C

INSPECTION METHOD FOR INSPECTING AN OBJECT AND MACHINE VISION SYSTEM

BACKGROUND OF THE INVENTION

Field of the Invention

One or more embodiments described herein relate to systems and methods for inspecting objects.

Description of Related Art

Manual inspections are often performed on construction objects on a construction site. For example, a worker assembles the construction object according to a reference image of a previously built reference object. After finishing, a quality check is manually performed by the worker to check the assembly for errors. In particular, the worker inspects an inspection object (e.g., the construction object) by comparing it to the reference image of the reference object. During this manual inspection, the worker may recognize differences between the inspection object and the reference image of the reference object. The worker may then correct them by himself or have them corrected.

Such a manual approach to quality assurance for the inspection object is widely used, but very time consuming, costly and prone to errors. In particular, the outcome of such an inspection strongly depends on the effort and the precision the worker is capable to spend on the inspection.

SUMMARY OF THE INVENTION

One or more embodiments described herein provide a system and method of inspecting an object that is faster, more accurate, comprehensive, and/or less costly than inspection methods that are manually performed by a worker.

These or other embodiments provide a cost-effective yet failure-proof inspection method for inspecting an inspection object.

In accordance with one or more embodiments, an inspection method comprises comparing an inspection image of an inspection object to a reference image of a reference object; recognizing at least one inspection part in the inspection image and at least one reference part in the reference image, wherein the inspection part and the reference part correspond to each other; registering the inspection image onto the reference image using the inspection part and the reference part and providing a set of registration data, and checking for at least one error using the inspection image, the reference image, and the set of registration data.

In one embodiment, registering an image or the registration of an image onto another image may be understood to comprise a process of transforming image data of at least one of the images from one coordinate system onto another. Registration may apply a transformation of pixels of one image in order to, for example, move, rotate, scale, and/or shear the image onto the coordinate system of another image so that the two images are effectively overlaid and/or overlapping.

A common problem when directly comparing images to one another may arise from interferences in the images. For example, a viewing angle of the inspection image may differ from a viewing angle of the reference image. In other words, the inspection image may look distorted compared to the reference image, even if the inspection object and the reference object are identical. A pure point-by-point comparison of the images may thus fail to differentiate between relevant, object-dependent differences and non-relevant, image-dependent and/or image acquisition-dependent differences. As an example, backgrounds may differ between the inspection image and the reference image. Also, other kinds of interferences may apply.

To solve these and/or other kinds of interferences, one or more embodiments of the invention may provide the set of registration data which may be used to improve a pixelwise correspondence between the inspection image and the reference image. In one embodiment, the set of registration data may be used to compensate relative distortions between the two images. Comparisons between the images may become more failure-proof, thus rendering it possible to automatize inspections, which in turn may increase cost-efficiency while keeping a high level of quality of the inspections. Moreover, comparisons may follow autonomously defined comparison rules; comparison rules need not be pre-defined manually.

At least one of the inspection part or the reference part may be recognized using a neural network, preferably a Faster Regional Convolutional Neural Network (hereinafter: FRCNN). The neural network may be configured to semantically classify image data. Classifying image data may also include localizing classified parts.

In one embodiment of the invention, the inspection method may comprise a homography estimation based on at least one reference base point derived from the reference part and at least one inspection base point derived from the inspection part. In one embodiment, a homography may be or at least relate to a transformation between two coordinate planes.

The number of reference base points and/or of inspection base points may be balanced such that the homography estimation is sufficiently precise and that, nonetheless, an overly detailed and, probably misleading, estimation is avoided. For example, the registration may comprise a homography estimation based on less or equal than 100 reference base points. The number of inspection base points may preferably be equal or at least essentially equal to the number of reference base points.

In one embodiment of the inspection method, the at least one error may comprise at least one of an incorrect part error, a part orientation error, an alignment error, a fixing element error, or a measurement error.

The inspection method may be adopted to a specific area of application. The area of application may be, for example, building construction, industrial assembly, in particular the assembly of support structures. In at least one embodiment of the inspection method, the inspection object may be or correspond to a composite construction object. The composite construction object may be located on a construction site. It may be configured to be used in building construction. It may be or comprise a support structure.

In one embodiment, the neural network may be trained to identify one or more classes of parts pertaining to the area of application the inspection method is adopted to.

In one embodiment, the composite construction object may comprise a plurality of inspection construction parts. The reference object may be or correspond to a reference composite construction object. The reference object may comprise a plurality of reference construction parts. Then, the neural network may be trained to identify one or more classes of construction parts and/or their orientations, and for example the kind of inspection construction parts and/or the reference construction parts.

The reference image may comprise at least one of building information model data (BIM data), computer aided design data (CAD data), or a set of construction parts data. The set of construction parts data may comprise data describing, for example, at least one of a form, a size, a location, or an orientation.

In one embodiment of the invention, a checking operation may be performed for the at least one error. This operation may comprise defining a focus region based on a reference part and comparing at least one inspection part being inside the focus region to the reference part. For example, it may be checked whether at least one inspection part inside the focus reason has at least one of an incorrect part error or a part orientation error. Checking for the at least one error (e.g., checking for at least one measurement error) may comprise searching for the presence of at least one characteristic property. The characteristic property may, for example, correspond to or be indicative of a class of construction objects the reference composite construction object belongs to.

In the case where the reference composite construction object is a support structure having one or more horizontal or at least essentially horizontal channels, the characteristic property may pertain to at least one such horizontal or at least essentially horizontal channel. In one embodiment, the characteristic property may be or at least comprise a horizontal or at least essentially horizontal construction part.

In one embodiment, the inspection method may comprise computing a scaling factor for an element having known dimensions. It may also comprise searching for the element having the known dimensions in the inspection image based on the scaling factor. The element may have known dimensions and may be or at least comprise at least one of a fiducial, a mark or a tag.

In one embodiment, the method may comprise analyzing the focus region using a neural network. The neural network may also be a FRCNN. It may be trained to analyze a zoomed image of the focus region. It may be adopted to the specific area of application the inspection method is adopted to. For example, the neural network may be trained to identify one or more classes of parts pertaining to the area of application.

In some embodiments, including those where the inspection method is adopted to applications pertaining to construction, for example pertaining to support structures, checking for the at least one error may comprise a search for at least one fixing element within the focus region. Alternatively, or additionally, checking for the at least one error may comprise counting fixing elements within the focus region.

The inspection method may comprise presenting an overlaid image containing at least a portion of the inspection image and at least a piece of the reference image. In one embodiment, the inspection method may comprise presenting the overlaid image, wherein the overlaid image comprises at least one error-marking label.

In one embodiment, errors found during inspection may be dynamically visually analyzed by a user when a sliding button is presented. The sliding button may allow a user to modify a visibility of at least one of the areas of the inspection image or the reference image. Visibility may refer, for example, to at least one of a geometric proportion, a transparency, a contrast, or a brightness.

In accordance with one or more embodiments, a machine vision system is configured to inspect an inspection object comprising a plurality of inspection parts. The machine vision system comprises an inspection data interface configured to acquire an inspection image of the inspection object; a reference data interface configured to acquire a reference image; and at least one processor configured to compare an inspection image of the inspection object to a reference image of the reference object. The at least one processor comprises a part recognizer configured to recognize at least one inspection part in the inspection image and at least one reference part in the reference image, registration logic configured to register the inspection image onto the reference image using the inspection part and the reference part and to provide a set of registration data, and an error checker configured to check for at least one error using the inspection image, the reference image, and the set of registration data. The machine vision system may implement the method embodiments and, for example, may solve the objectives described herein.

The machine vision system may be configured to inspect an inspection object, for example, a composite construction object, wherein the inspection object comprises a plurality of inspection parts, by comparing an inspection image of the inspection object to a reference image of the reference object. The composite construction object may comprise a plurality of construction parts. The composite construction object may be located on a construction site. It may be configured to be used for building construction.

The machine vision system comprises an inspection data interface for acquiring the inspection image. The system may further comprise a reference data interface for acquiring the reference image. The system may further comprise at least one processor configured to compare an inspection image of the inspection object to a reference image of the reference object. The processor may also comprise a part recognition unit (or part recognizer) configured to recognize at least one inspection part in the inspection image and at least one reference part in the reference image. Furthermore, the system may comprise a registration unit (or registration logic) configured to register the inspection image onto the reference image using the inspection part and the reference part and to provide a set of registration data. The system may also comprise an error checking unit (or error checker) configured to check for at least one error using the inspection image, the reference image, and the set of registration data. In some embodiments, the error checking unit may be configured to check for at least one of an incorrect part error, a part orientation error, an alignment error, a fixing element error, or a measurement error.

At least one of the part recognition unit or the error checking unit may comprise a neural network module, in particular a FRCNN module. In particular, the part recognition unit and the error checking unit may comprise a neural network module, in particular a FRCNN module. At least one neural network module may be configured to recognize a fixing element.

The machine vision system may further comprise a semantic foreground-filtering unit (or semantic foreground-filter). The semantic foreground-filtering unit may be configured to filter and/or select foreground within at least one of the inspection image or the reference image. Generally speaking, the semantic foreground-filtering unit may be configured to classify at least one region of at least one of the inspection image or the reference image as either foreground or background.

In one embodiment, "foreground" may be or comprise image content relevant to the inspection. In particular, it may comprise a region wherein the inspection object and/or the reference object is or are represented. In one embodiment, "background" may describe image content not relevant to the inspection, in particular not related to the inspection object or the reference object. The semantic foreground-filtering unit may be configured to remove and/or re-color regions of the inspection image and/or the reference image containing background.

The machine vision system may also comprise a 3D camera. In one embodiment, "3D camera" may comprise any device capable of providing depth image data, for example laser-scanning devices, time-of-flight cameras, or the like. The machine vision system, in particular the foreground-filtering unit, may be configured to use the depth image data for filtering and/or selecting foreground.

In some embodiments of the machine vision system, at least one neural network module may be configured to recognize a support structure element, in particular a support structure element made of a metal. The support structure element may be and/or comprise, for example, a fixing element, a channel, or the like. The support structure element may be configured for use in building construction.

In one embodiment, the machine vision system may comprise at least two deep convolutional neural networks, for example at least two FRCNN modules, which may be trained using different data sets.

Other technical advantages will be readily apparent to one skilled in the art from the following figures and description. Moreover, while specific advantages have been enumerated, various embodiments may include all, some or none of the enumerated advantages.

The invention will be described further, by way of example, with reference to the accompanying drawings which illustrate preferred embodiments thereof, it being understood that the following description is illustrative of and not limitative of the scope of the invention. The features shown there are not necessarily to be understood to scale and are presented in such a way that the special features of the invention are clearly visible. The various features may be realized individually or in combination in any desired way in variants of the invention.

BRIEF DESCRIPTION OF THE DRAWINGS

In the drawings:

FIG. 9 shows an example of an alignment error that occurs when a top edge of a vertical channel extends higher than a top edge of a perpendicular horizontal channel.

FIG. 10A shows an image of a reference object.

FIG. 10B shows an example of a measurement error where the length of a channel does not match an expected measurement, based on the reference object of FIG. 10A.

FIG. 13A shows a first pair of images used for training of foreground-background classifications.

FIG. 13B shows a second pair of images used for training of foreground-background classifications.

FIG. 13C shows a third pair of images used for training of foreground-background classifications.

FIG. 14A shows a first pair of images illustrating results of the training of foreground-background classifications.

FIG. 14B shows a second pair of images illustrating results of the training of foreground-background classifications.

FIG. 14C shows a third pair of images illustrating results of the training of foreground-background classifications.

DETAILED DESCRIPTION OF THE INVENTION

Figure 1:
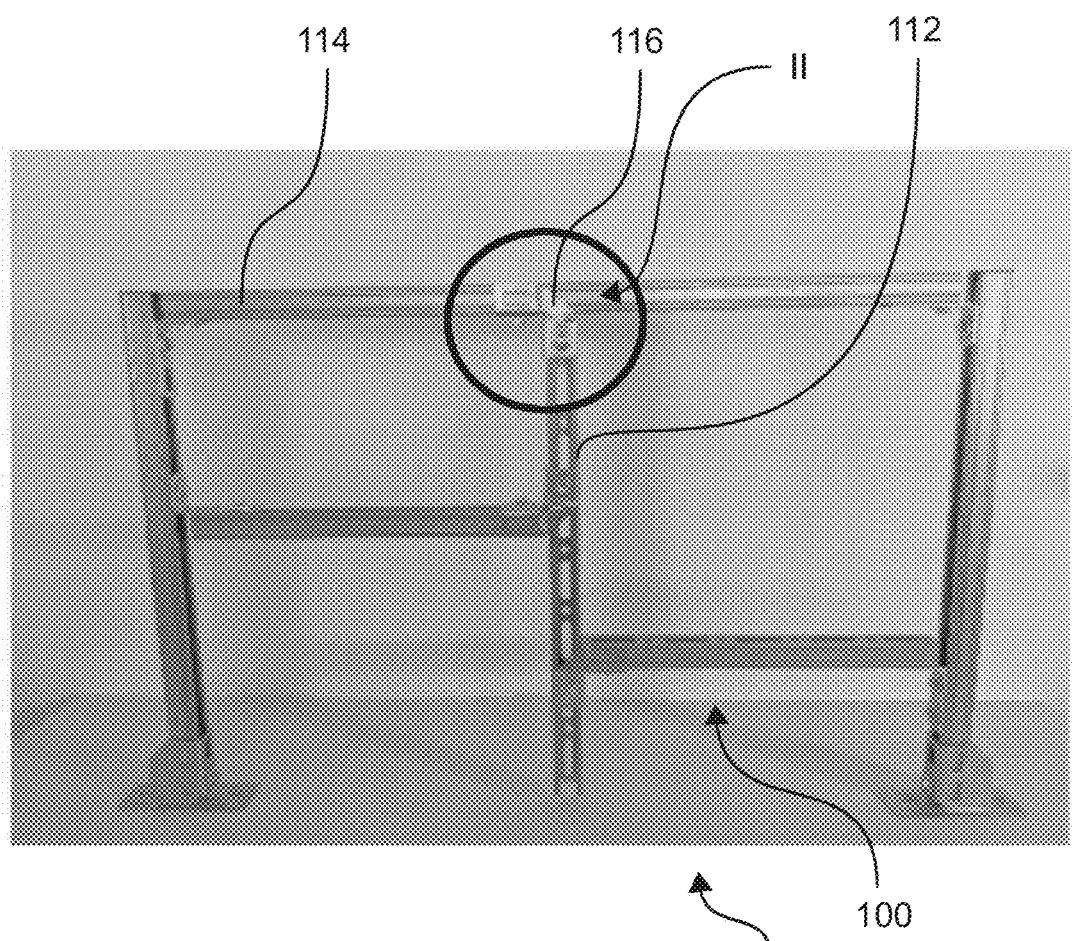
FIG. 1 shows an inspection image of an inspection object in the form of a composite construction object.

The subject matter is now described with reference to the drawings, wherein like reference numerals are generally used to refer to like elements throughout. In the following description, for purposes of explanation, numerous specific details are set forth in order to provide a thorough understanding of the subject matter. It may be evident, however, that the subject matter may be practiced without these specific details or with other combinations of these specific details. In other instances, methods, structures, and devices are illustrated in block diagram or flow chart form in order to facilitate describing the claimed subject matter.

FIG. 1 shows an inspection image 110 of an inspection object 100. The inspection object 100 may take any of a variety of forms including structural frameworks, beams, trusses, facades, assemblies, supports, or other types of structures. In another embodiment, the inspection object 100 may be a commercial or industrial product, electrical boards, an appliance, conduits, systems, or any other object that may be subject to inspection for defects or other features. In FIG. 1, an example of the inspection object 100 is shown in the form of a composite construction object that serves as a support structure for a building.

Figure 2:
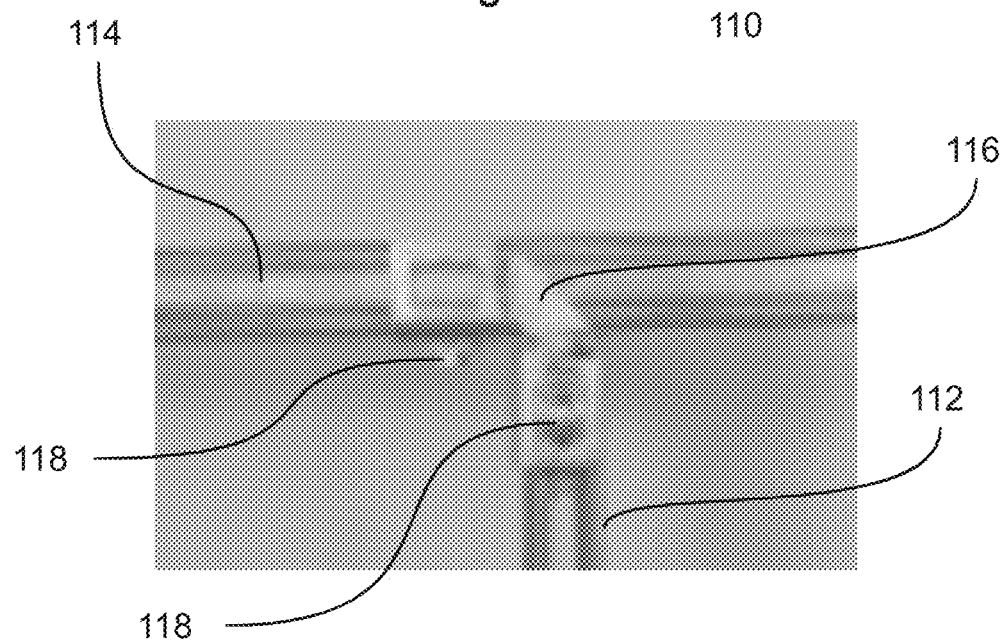
FIG. 2 shows a zoomed area of the inspection image of FIG. 1.

FIG. 2 shows an area II of FIG. 1 in a zoomed view.

Referring to FIGS. 1 and 2, the inspection image 110 shows that the inspection object 100, as actually assembled by a worker, comprises several inspection parts. For instance, it comprises several vertical channels 112, of which, as an example, one is marked with a reference number. And, it comprises several horizontal channels 114, of which, again as an example, one is marked with its reference number. Several connectors connect the vertical channels 112 and the horizontal channels 114. As an example, a connector 116 (in the form of an angular element) connects one of the vertical channels 112 and one of the horizontal channels 114. In addition to these features, fixing elements 118, two of which, as examples, are marked with reference numbers in FIG. 2, fix the connector 116 to the vertical channel 112 and to the horizontal channel 114.

Figure 3:
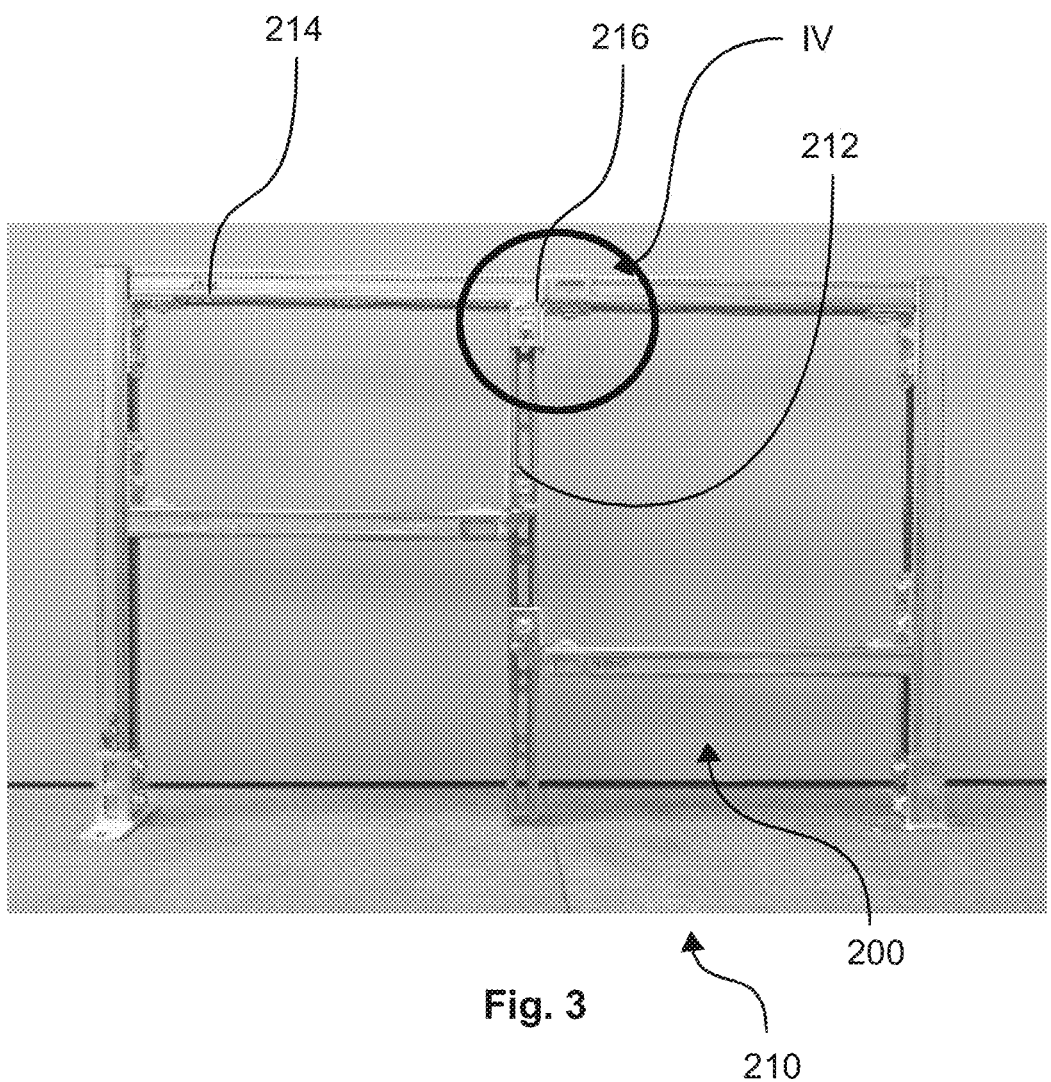
FIG. 3 shows a reference image of a reference object in the form of a reference composite construction object, which corresponds to the inspection object of FIG. 1.

FIG. 3 shows a reference image 210 of a reference object 200 in the form of a reference composite construction object.

Figure 4:
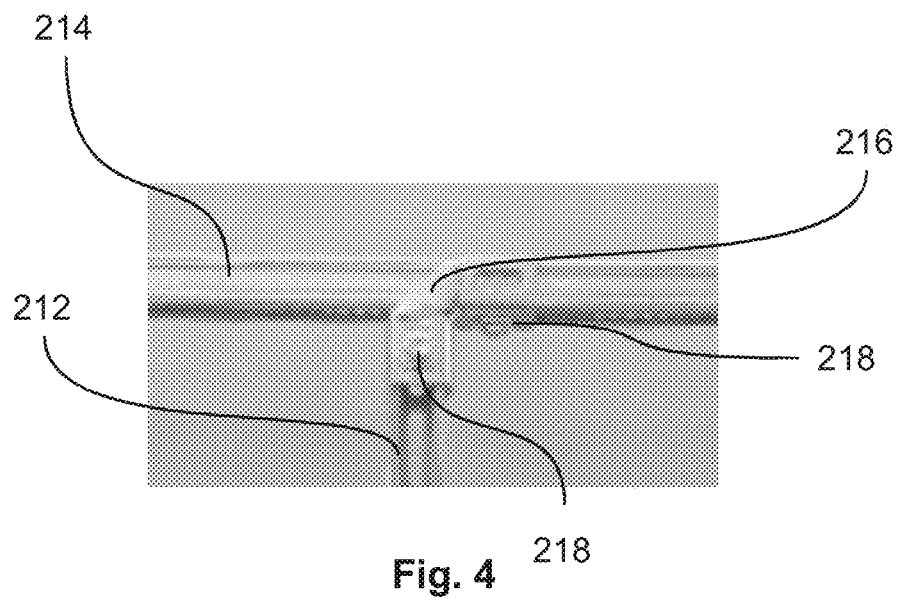
FIG. 4 shows a zoomed area of the reference image of FIG. 3.

FIG. 4 shows an area IV of FIG. 3 in a zoomed view.

Referring to FIGS. 3 and 4, the reference object 200 corresponds to, or at least is supposed to be a template for, the inspection object 100 as shown in FIGS. 1 and 2. Therefore, it also comprises several parts, including in particular several reference parts. For example, it comprises several vertical channels 212 and several horizontal channels 214, of which only one of each is marked with a reference number in this example. As shown in more detail in FIG. 4, a connector 216 in the form of an angular element connects, and fixes by fixing elements 218, one of the vertical channels 212 to one of the horizontal channels 214.

As can be drawn from a comparison of FIGS. 2 and 4, the connectors 116 and 218 are of similar form but are assembled in opposite directions. Hence, the inspection object 100 contains at least one error, and in this example in particular a part 116 which has an orientation error, e.g., is assembled in the wrong direction as indicated by the comparison with the reference part in FIG. 4.

Figures 5A, 5B:
FIG. 5A shows an image of a part of a reference object.
FIG. 5B shows an example an incorrect part error, where a class of error wrong types of angular elements are used, based on the reference object of FIG. 5A.
Figure 6A:
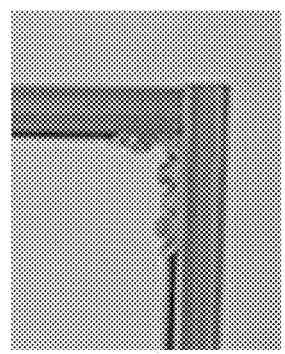
FIG. 6A shows an image of part of a reference object.

In general, three classes of errors may be considered in variants of a method of inspection and in embodiments of a machine vision system, embodiments of which will be described hereinafter. The three classes of errors may include those listed below. Of course, the methods and devices described hereinafter are not limited to these classes of errors, e.g., different classes or types of errors may exist in other embodiments, whether for the same type of inspection object or an inspection object different from those described herein.
1. Error due to an incorrect or missing part used (incorrect part errors)
2. Error due to incorrect assembly
   a. Errors due to incorrect part orientation (part orientation errors)
   b. Errors due to unexpected gaps (gap errors)
   c. Incorrect channel alignment (alignment errors)
   d. Errors related to fixing elements (fixing element errors)
3. Measurement errors FIGS. 5A, 5B. 6A, 6B, 7, 8, 9, 10A, and 10B illustrate examples of these classes of errors. For clarity and convenience, the errors are marked with black rectangles in these figures. FIGS. 5A, 6A, and 10A show reference objects or parts thereof, and FIGS. 5B, 6B, and 10B show corresponding inspections objects or parts (e.g., as assembled by a worker) thereof.

FIG. 5B shows an error (or defect) where wrong types of angular elements are used, thus resulting in an incorrect part error. This type of error is evident based on a comparison of the image of FIG. 5B with the reference image of FIG. 5A.

Figure 6B:
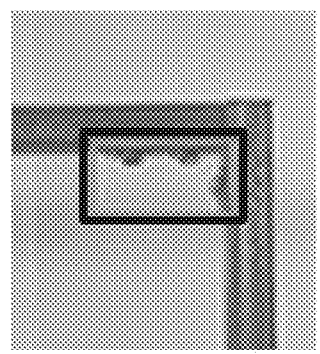
FIG. 6B shows an example of a part orientation error, where parts are assembled in different orientations than intended, based on the reference object of FIG. 6A.

FIG. 6B shows an example of a part orientation error which occurs when parts are assembled in different orientations than intended. This type of error is evident based on a comparison of the image of FIG. 6B with the reference image of FIG. 6A.

Figure 7:
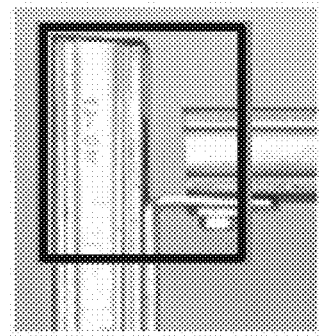
FIG. 7 shows an example of a gap error, where two parts have erroneously been mounted spaced apart from each other.

FIG. 7 shows an inspection image where two parts have erroneously been mounted spaced apart from each other. Such a case is an example of a gap error.

Figure 8:
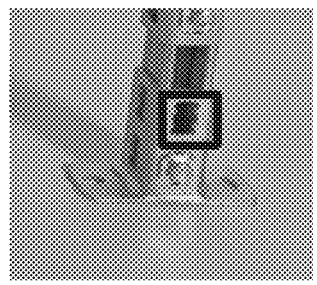
FIG. 8 shows an example of a fixing element error, where a base element lacks at least one fixing element.

FIG. 8 shows an example where a base element lacking at least one fixing element, thus resulting in a fixing element error. For reasons of clarity, hereinafter any error related to a fixing element may be considered as a fixing element error, even if it could be classified differently. Therefore, the error according to FIG. 8 is not classified as, for example, incorrect part error. In the context of composite construction objects, fixing elements are used very frequently. Therefore, an inspection method for inspecting such a composite construction object may cover a great percentage of possible errors when the method is specifically adapted to examine fixing elements.

FIG. 9 shows an example of an alignment error that occurs when a top edge of a vertical channel extends higher than a top edge of a perpendicular horizontal channel.

FIG. 10B shows an example of a measurement error where the length of a channel does not match an expected measurement. For example, in FIG. 10B the horizontal channel in the inspection image is different from the reference image of FIG. 10A in that it is longer than the corresponding horizontal channel shown in FIG. 10A. Such an error is evident based on a comparison of the inspection image and the reference image.

Figure 11:
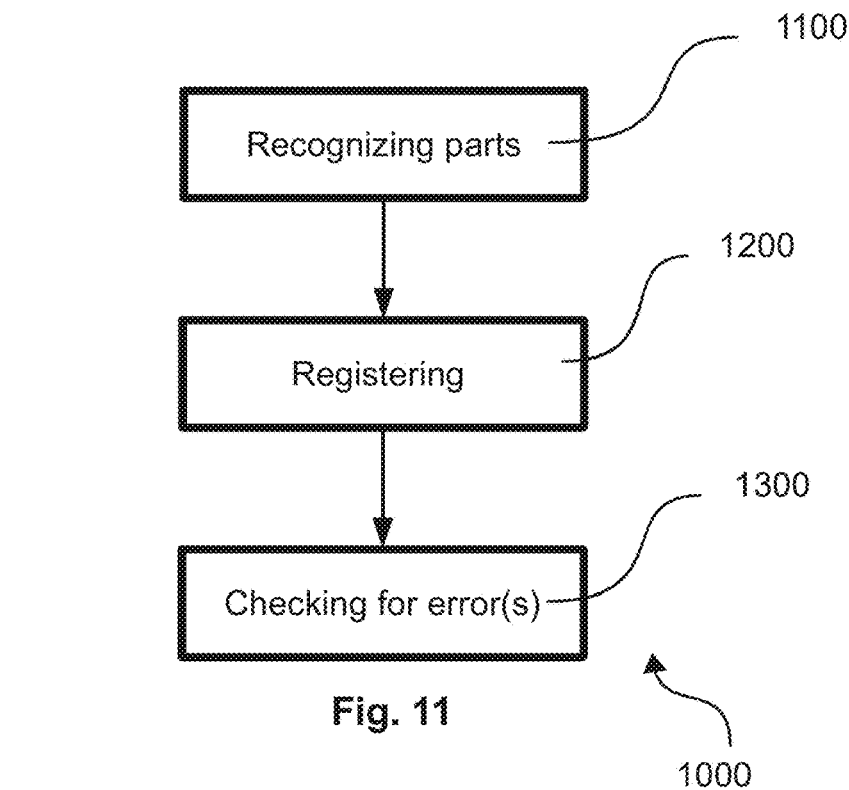
FIG. 11 shows a flow chart illustrating an inspection method.

FIG. 11 shows a flow chart illustrating an embodiment of an inspection method 1000. The inspection method 1000 is configured for inspecting an inspection object 100, and may involve comparing the inspection image 110 of the inspection object 100 to the reference image 210 of the reference object 200.

Referring to FIG. 11, the method includes, at 1100, an operation of recognizing at least one inspection part in the inspection image 110 (which, for example, may be the connector 116 in the inspection image 110) and at least one reference part in the reference image 210 (e.g., the connector 216), where the inspection part and the reference part correspond to each other.

At 1200, a registration operation is performed where the inspection image 110 is registered onto the reference image 210 using the recognized inspection part and the recognized reference part. Among others, a set of registration data is provided as a result of the registration operation 1200. In one embodiment, the set of registration data may be in the form of transformation rules for transforming at least one of the inspection image 110 or the reference image 210 or parts thereof. In one embodiment, the set of registration data may also be in the form of calculated image data, for example, representing a registered inspection image resulting from applying the transformation rules to the inspection image 110 and/or the reference image 210.

At 1300, a checking operation is performed wherein the inspection object 100 is checked for at least one error using the inspection image 110, the reference image 210, and the set of registration data. In one embodiment, the checking operation 1300 comprises comparisons of data inferred from the inspection image 110 and the reference image 210. For the comparisons, at least one of the inspection image 110 or the reference image 210 is or are transformed using the set of registration data.

Figure 12:
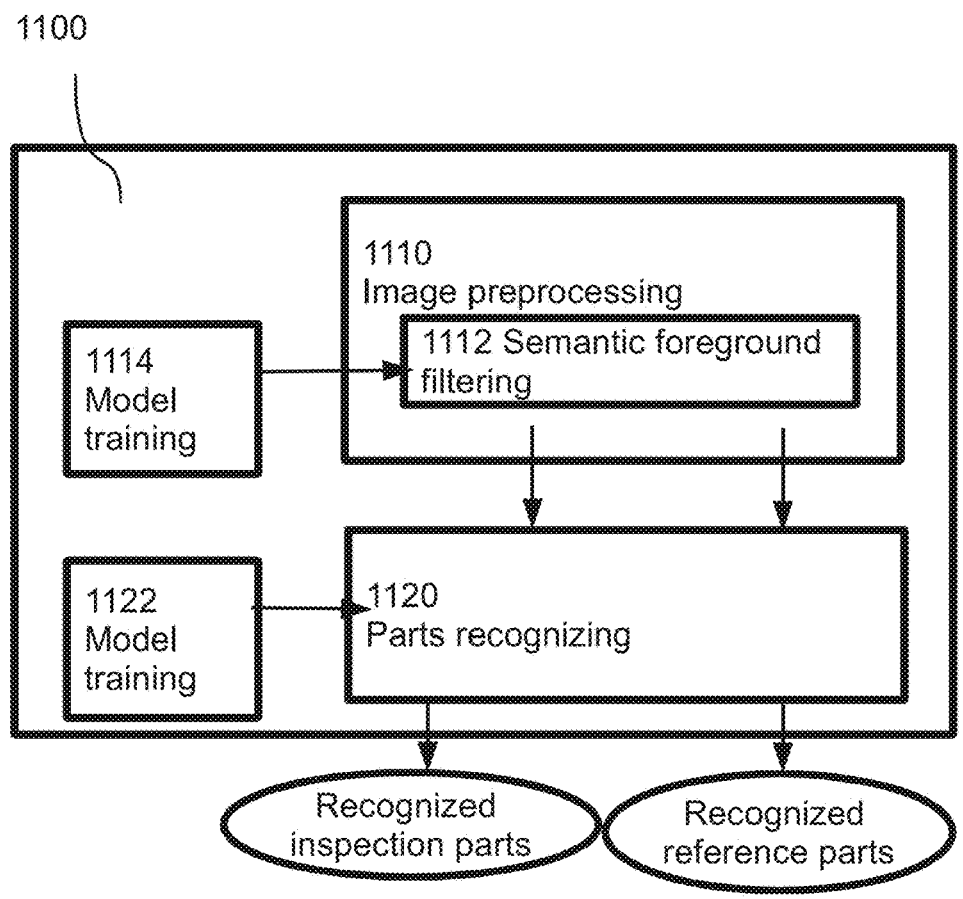
FIG. 12 shows a flow chart illustrating details of a recognizing step of the inspection method of FIG. 11.

FIG. 12 shown an embodiment of the recognizing operation 1100. In this embodiment, the logic of the recognizing operation 1100 comprises an image preprocessing operation 1110 and a parts recognizing operation 1120. Images of construction objects often have little contrast and few color variations. Therefore, depending on the type of image, quality, etc., the image preprocessing operation 1110 may include automatically correcting the inspection image 110 and/or the reference image 210 and standardized them for contrast, brightness, white balance, and/or other features.

In some cases, irrelevant background in images, in particular in the inspection image and/or the reference image, may decrease the reliability of the method 1000. Depending on, for example, the type of image, the inspection image 110 and/or the reference image 210 may undergo a filtering operation. In one example, foreground-background differentiation in a semantic foreground filtering operation 1112 may be performed by passing through a semantic foreground filtering unit (hereinafter: SFFU). This can essentially be considered as an image segmentation task where the goal is to classify each pixel of an image as belonging to either one of foreground or background classes.

Due to the little color variation to be expected, various forms of artificial intelligence or modeling may be used for implementing the SFFU. In one example, a deep neural network-based approach may be used for implementing the SFFU. In this case, semantic features are extracted using convolutional neural networks to successfully segment pixels into foreground or background, even if the contents of the foreground and the background are visually more or less similar to each other.

This supervised image segmentation is prepared in a model training operation 1114 using annotated training data in the form of training image pairs. Examples of such training image pairs is shown in FIGS. 13A, 13B and 13C in the form of an input image and an output mask image, in particular with pixels in grey mapping to foreground and pixels in black mapping to background. In this example, altogether 57 images may form the basis of the training data. The images show several construction objects, in particular support structures, as foreground, and have varying backgrounds.

To increase the reliability of the foreground-background segmentation, in one embodiment synthetic background images may be added to the training data. In this way the training can use more than the original number of images. In particular, additional, synthetic images may be created by placing the construction objects of the 57 images onto new background images of typical construction sites. Also, further data augmentation procedures, for example flipping, changing contrast, brightness, etc., may be applied to further enlarge the set of training image pairs. In this example, a set of 279 synthetic images is produced.

An example of the convolutional neural network architecture comprises a U-net convolutional deep neural network encoder-decoder architecture with two output classes—background and foreground—with skip connections.

A pre-trained convolutional neural network encoder may be used in the segmentation architecture. In particular, the model training 1114 uses transfer learning with a ResNet convolutional encoder pre-trained on the ImageNet dataset so that the encoder part of the architecture has already learned how to extract visually salient features, so that it is ready for fine-tuning rather than to be trained from scratch. Then, the SFFU is trained using the 57 original images plus the 279 synthetic images.

FIGS. 14A, 14B, and 14C show examples of the resulting reliability of the trained SFFU. In particular, FIG. 14A to 14C show three images in the upper half which are classified into foreground or background as shown in the lower half of these figures. Black pixels correspond to background and white pixels correspond to foreground.

The model training operation 1114 is not limited to the number of training image pairs as described. More or less training image pairs may be produced and/or used in other embodiments, for example, depending on the desired levels of reliability and/or speed of training. Also, in case additional training data is gathered at a later point of time, the model training operation 1114 may be repeated.

After the model training operation 1114 has finished, each image to be preprocessed in the image preprocessing operation 1110 may be passed through the trained SFFU. Pixels classified by the SFFU as background may serve as filtering mask for the respective image or images, e.g., the inspection image 110 and/or the reference image 210. In case the reference image 210 is given in the form of BIM data, CAD data or the like, the image preprocessing operation 1110 may be omitted for the reference image 210.

At 1120, the (preprocessed) inspection image 110 and the reference image 210 enter a subsequent stage according to the parts recognizing operation. In one embodiment, this operation involves detecting part bounding boxes and labels on both the inspection image 110 and the reference image 210. In case the reference image 210 is given in the form of numerical construction data like BIM data, CAD data or the like, in some cases the part bounding boxes and labels in the reference image 210 may be inferred directly from the available numerical construction data.

The parts recognizing operation 1120 may be performed using a part recognition unit. In one embodiment, the part recognition unit may also comprise a deep convolutional neural network for performing object detection and recognition.

According to one embodiment of the method 1100, the part recognition unit comprises a FRCNN model. Other embodiments of the method 1100 may use other types of models, which may, example selected for reasons of speed or accuracy.

The FRCNN model may comprise a two-stage architecture with a region proposal network for generating region proposals. The region proposal network is based on a pre-trained convolutional neural network feature extractor, which may be, for example, ResNet101. The second stage comprises a network that uses these proposals to detect objects. Experiments show that the FRCNN model allows for acceptable speeds—near-real time or even real-time on general purpose equipment—while providing high levels of accuracy. In particular, results may be obtained in less than, for example, approximately 2 seconds on a general-purpose CPU. The FRCNN model may have an architecture as described, for example, in Ren, et al 2016 (arXiv: 1506.01497).

In one embodiment, its anchor box parameter may be adapted as described briefly below. Hereinafter, an anchor may be a box that is considered by the region proposal network which predicts the possibility of the anchor being background or a foreground object and then refines the anchor into bounding box detection outputs. A sliding window is moved across a convolutional feature map computed from the input image and anchor boxes are generated at each sliding window position.

Scale and aspect ratio are two parameters that may be used in the generation of anchor boxes. In one embodiment, the scale determines the size of the anchor boxes and the aspect ratio determines the proportions of the boxes at each sliding window position. As defaults, scales in the range 0.25 to 2, in particular in 10.25, 0.5, 1.0, 2.01, and/or aspect ratios in the range 0.25 to 3, for example in [0.25, 0.5, 1.0, 2.0, 2.5, 3.0], may be used. In this way, also channels having aspect ratios greater than, for example, 2:1 may be recognized. Different scales and/or aspect ratios may be used in other embodiments.

Apart from modifying the default anchor box parameters and the number of output classes, default FRCNN model parameters may be used as, for example, in the implementation of TensorFlow.

In one embodiment, the FRCNN model may downsize images to a predetermined range. The predetermined range may be, for example, a maximum dimension size of 1024 px and a minimum dimension size of 600 px. Images having a 4:3 aspect ratio, may be resized to, for example, 800 px×600 px when they are run through the part recognizing unit. Different ranges of sizes and ratios may be used in other embodiments.

At 1122, a model training operation may be performed where the recognizing unit is trained using, for example, transfer learning of a model pre-trained on a large dataset, for example the Common Objects in Context (COCO) dataset. After pre-training, final output layers are replaced to match the number of classes for the intended object detection and recognition. Earlier layers of the model learn general-purpose features typically useful for the topics to which the inspection object 100 or the reference object 200 pertain, for example edges or color patterns.

In this example, 27 classes of parts are trained. The classes correspond to 8 orientations of a first connector, 4 orientations of a second connector, 6 orientations of a first channel, 6 orientations of a third connector, 2 orientations of a second channel, and one additional open-channel class for an open channel in mostly shadow. The additional open-channel class may be used to reduce or minimize within-class visual variance because shadow cases may be very visually different from shadow-free cases.

The amount of training data may be increased using data augmentation functions, in particular an adjustment of image brightness, image contrast, image saturation or image hue, and/or random flips of images and bounding boxes horizontally or vertically. Preferably, when flipping horizontally, bounding box classes may be modified accordingly. In some cases, transformation functions for data augmentation may be selected so that the augmented data can still be considered representative of the likely out-of-sample data distribution. Hence, data augmentation may act as regularizer and may help reduce or avoid overfitting.

In one implementation, the model may be trained using back-propagation and stochastic gradient descent with mini-batches of, for example, two images. Each mini-batch contains a sample of a predetermined number of anchors, e.g., 256 positive and negative anchors sampled stochastically. The default momentum optimizer may be used with default learning rate scheduling parameters with an initial learning rate of 0.0002 linearly reduced to 0.000002 and a momentum optimizer value of 0.89. A different initial learning rate and value may be implemented in another embodiment.

Training can be manually stopped, preferably once the total loss converges. The model training operation 1122 can take according to this example approximately 20 hours. The object detection model returns output bounding boxes with class labels and a confidence score for each bounding box prediction between 0 and 1. To reduce false positive results, a threshold may be applied. In one embodiment of the inspection method 1000, the threshold may be at least 0.6, and in one case 0.8. This may yield high quality detections but may also result in missing parts. The threshold may be a different value in another embodiment. For example, the threshold may be less than 0.5, in particular 0.4. This threshold level has been found to work well in practice for at least some applications.

The parts recognizing operation 1120 (and hence recognizing operation 1100) provides recognized inspection part data and reference part data for each detected part in the inspection image 110 and the reference image 210. In one embodiment, each part data may comprise coordinates of a bounding box and, preferably, also data about the type of the part.

Figure 15:
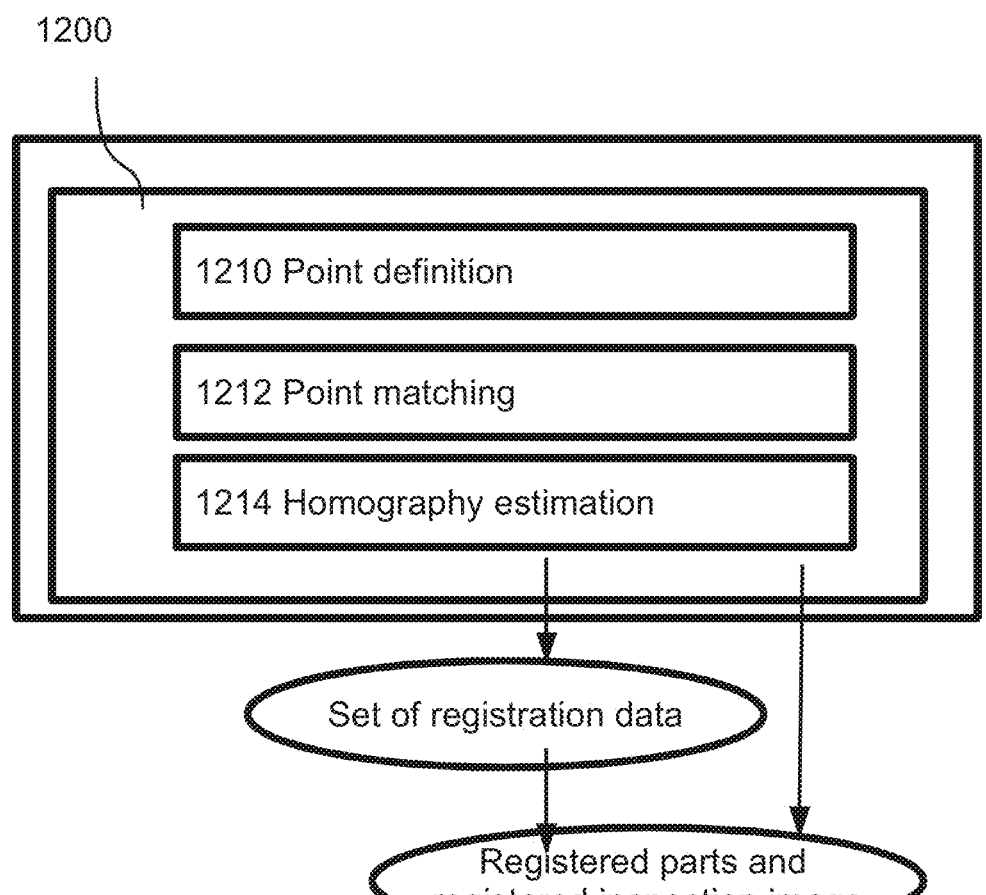
FIG. 15 shows a flow chart illustrating details of a registration step of the inspection method of FIG. 11.

FIG. 15 shows operations included in an embodiment of the registration operation 1200. Once the inspection parts and the reference parts have been recognized on the inspection image 110 and the reference image 210, these detections may be used to register the inspection image 110 and the recognized inspection part data onto the reference image 210. As a result, an "assembled" or overlaid image containing the recognized inspection parts overlaid onto the recognized reference parts may be obtained. The "assembled" recognized inspection parts may then be compared to the recognized reference parts in each region of the reference object 200 or the inspection object 100 to check for part errors, part orientation errors, and/or other errors or defects.

Figure 16:
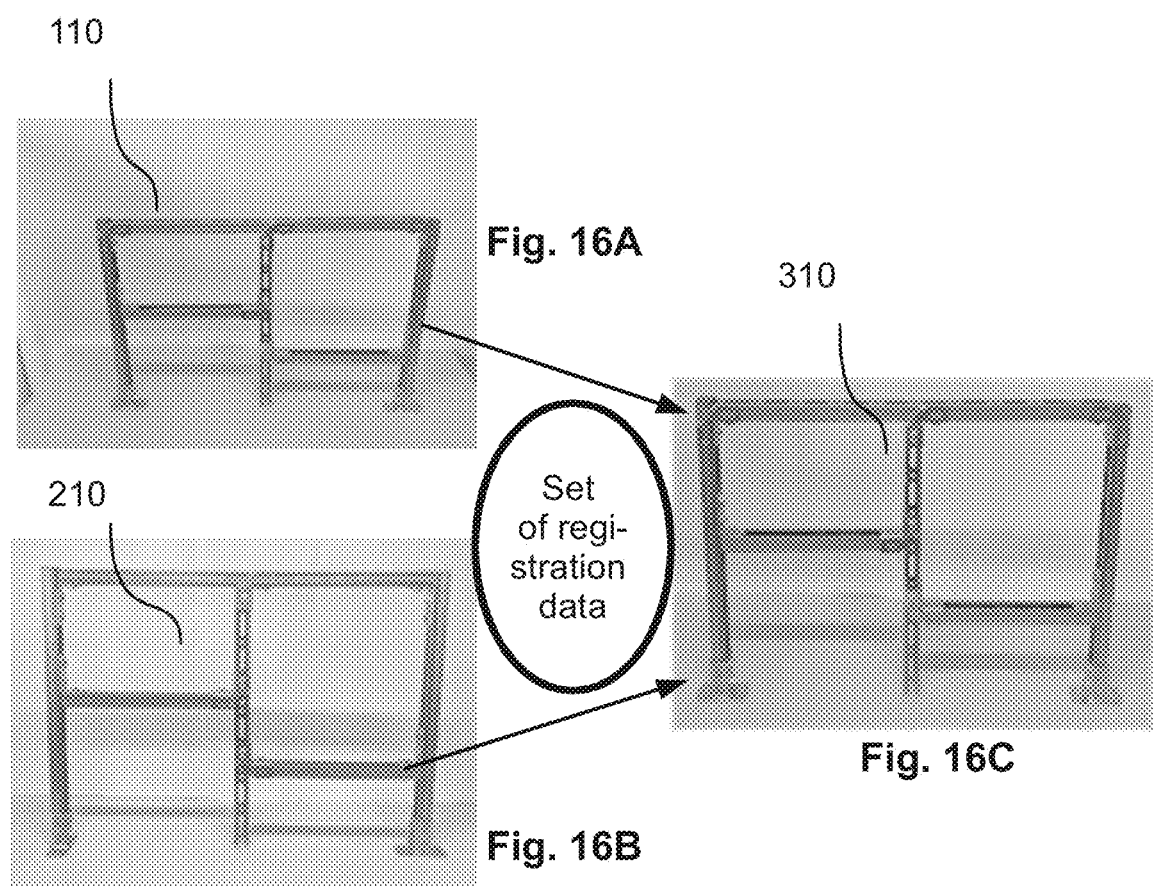
FIG. 16A schematically shows an example of an inspection image 110.
FIG. 16B shows an example of a reference image 210.
FIG. 16C shows an example of a registered inspection image 310.

FIGS. 16A, 16B and 16C illustrate results of the registration. FIG. 16A schematically shows an example of an inspection image 110. FIG. 16B shows an example of a reference image 210. FIG. 16C shows an example of a registered inspection image 310. The registered inspection image 310 is an overlaid image showing an object that is rectified to have a similar general form as the reference image 210, but with parts corresponding to the inspection image 110. A set of registration data may determine the transformation between the images 110, 210 and the registered inspection image 310.

Referring to FIG. 15, operation 1200 includes, at 1210, a point definition operation which involves computing corresponding base points on both the inspection image 110 and reference image 210. In one embodiment of the method 1000, a feature extraction algorithm may be used to perform this operation. One example of the feature extraction algorithm is a Scale Invariant Feature Transform (SIFT), but a different type of algorithm may be used in another embodiment. In another embodiment, the base points may be computed based on detected part bounding boxes. Then, visual differences between the inspection object 200 and the reference object 100 that often may occur may be taken into account. In another embodiment of the method 1000, the base points may be defined as the centroids of the part bounding boxes.

In one embodiment, base points are may be determined using a set of heuristics depending on the type of recognized part. The heuristics may be chosen so that each base point pertains to the same relative position within the part regardless of the type of part. For example, a first type of connector in the form of an angular element may typically be mounted on top of channels it joins; whereas a second type of connector in the form of an angular element may typically be mounted inside channels it joins. So, as a first heuristic, the centroid of the first type of connector may correspond to an inner corner point of the second type of connector, where the relevant corner depends on the orientation of that connector. Additionally, centroids may be used for channels or base elements. At this stage, remaining base points for all detected parts may also be computed for later use.

At 1212, a point matching operation may be performed to match base points of the inspection image 110 to base points in the reference image 210 for registration. In one embodiment, a brute-force matching algorithm or a FLANN feature matching algorithm may be used to perform the matching. In another embodiment, pairs of base points may be matched using a Coherent Point Drift (CPD) algorithm. The CPD algorithm is a non-rigid probabilistic point set registration algorithm that models the input base point set as a Gaussian Mixture Model (GMM) and treats a fixed point set (e.g., the set of base points of the reference image 210) as observations from the GMM. The optimal transformation of the input set onto the fixed set is computed iteratively by maximizing the maximum a posteriori estimation that the base point cloud is drawn from the GMM. In one implementation, channel points may be excluded from the computation since angle and base element points tend to be more consistent because they are computed from smaller bounding boxes.

At 1214, a homography estimation operation may be performed to estimate a homography between points of the inspection image 110 and points of the reference image 110. Once estimated a homography matrix, it may be used to project an input co-ordinate plane (in this case, the inspection image 110) onto a reference co-ordinate plane (in this case, the reference image 210). Doing this for all pixels in the inspection image 110 registers it onto the reference image 210. One implementation for performing the homography estimation may use a Direct Linear Transform (DLT) algorithm.

To avoid incorrect registrations, in one embodiment the matched base point sets may be filtered to keep only a limited or predetermined number of points, for example, only the four points nearest to the respective four corners of a frame. This may be performed by computing the Euclidean distance between each corner and keeping the point with the shortest distance. This filtering may lead to stable registration at least in many cases.

In case the inspection image 110 and/or the reference image 210 are downsized (e.g., 800×600 for the recognizing operation 1100), the point set and the homography estimation may be computed at the same dimensions too. In order to register the full resolution inputs, the homography estimation may be scaled back, for example, to the original dimensions. Finally, the scaled homography may be applied to the recognized inspection parts.

In accordance with the aforementioned embodiments, the registration 1200 results in a set of registration data representing the homography estimation and, when applying the set of registration data to the inspection image 110 and the recognized inspection parts in a registered inspection image and registered inspection parts.

Figure 17:
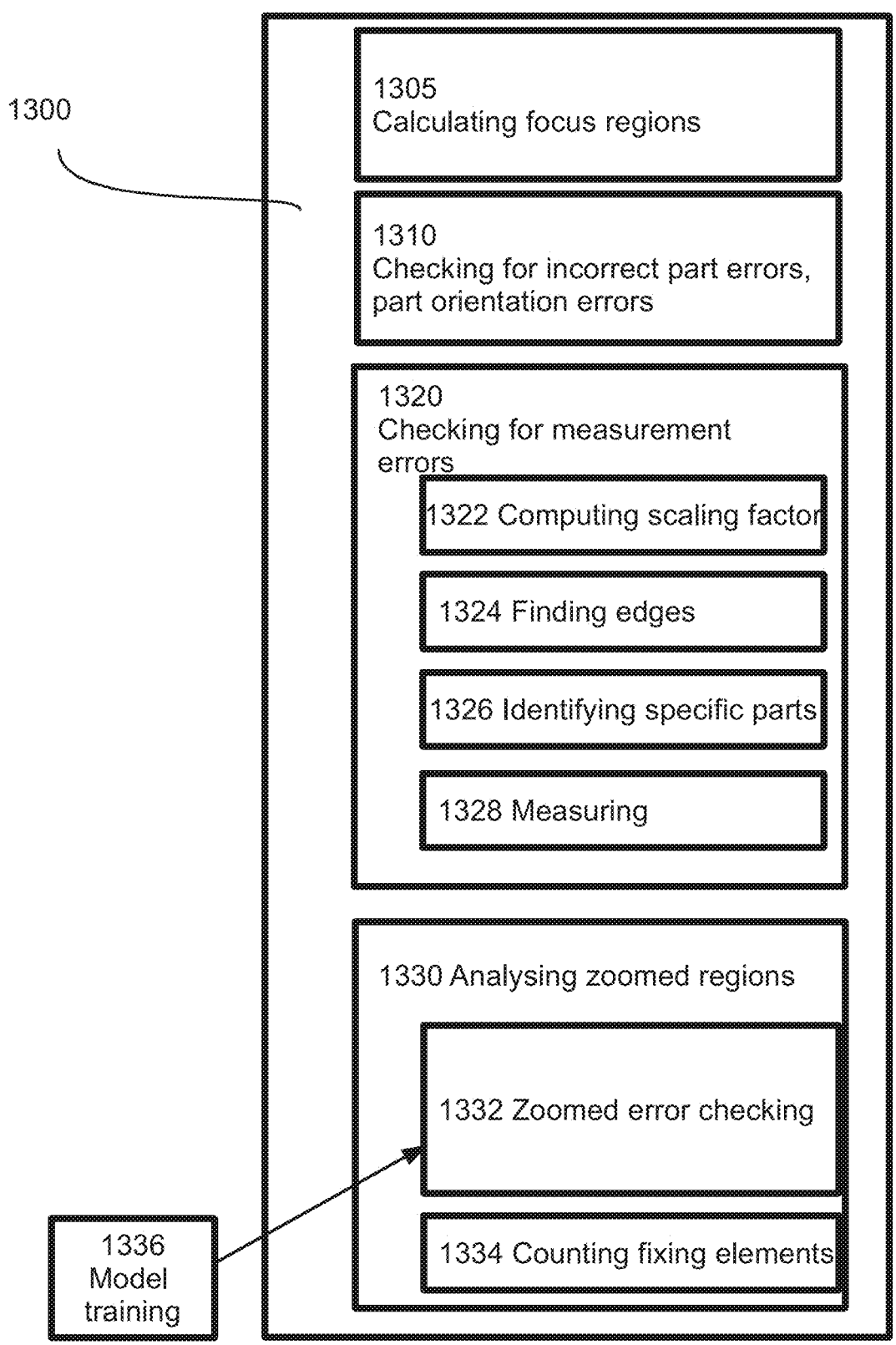
FIG. 17 shows a flow chart illustrating details of an error checking step of the inspection method of FIG. 11.

FIG. 17 shows a flow chart comprising operations that may be included in an embodiment of the checking operation 1300. In the checking operation 1300, the inspection object 100 is checked for various types of possible errors according to the classes of errors to be considered.

Referring to FIG. 17, the operation includes, at 1305, a focus region operation which generates one or more focus regions around each reference part. This may be accomplished, for example, by adding padding to the point for that part. The amount of padding may be chosen such that, on the one hand, no neighboring parts are included in the focus region, but on the other hand an inspection part in the focus region sufficiently overlaps the corresponding reference part. Hence, false part errors due to parts not taken into account for error checking may be avoided. The amount of padding may be selected using a different approach in another embodiment.

The amount of padding may vary depending on the type of parts present in the inspection object 100 or the reference object 200. For example, padding may be computed by first computing a scaling factor as the average of the maximum of the width and height of all base elements and angular elements in the reference object 200, and then multiply this by 0.75 to get the border amount to add to each point of each reference part. The focus regions may thus be slightly bigger than each reference part.

Figure 18:
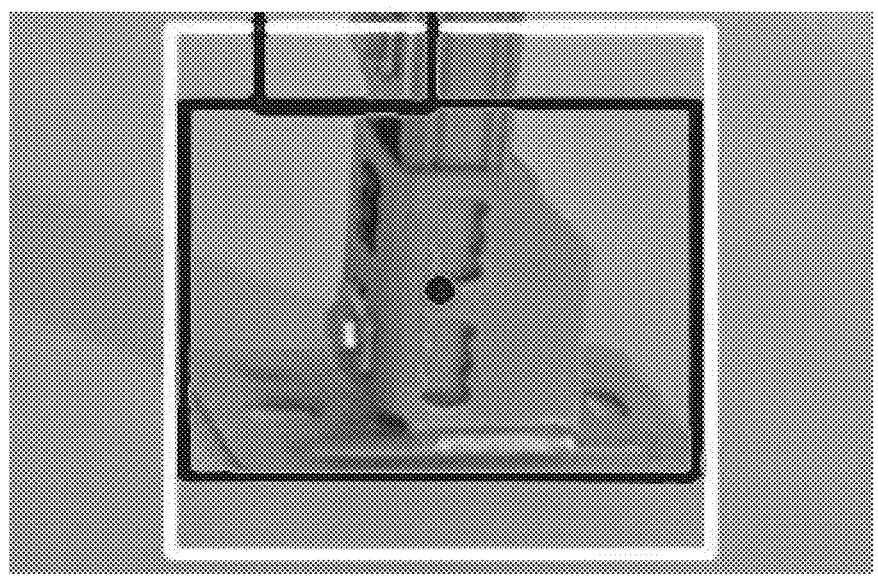
FIG. 18 shows an image illustrating a focus region.

FIG. 18 shows an example of a recognized reference part in the form of a base element, with its bounding box marked by a black rectangle with a black point at its center and a corresponding focus region marked as a white square.

Referring again to FIG. 17, at 1310, a first checking sub-operation is performed to check for incorrect part errors and part orientation errors. One way to do this is to check whether a registered inspection part that is nearby to (e.g., within a predetermined distance from) a corresponding reference part has the same type and orientation. Therefore, for each focus region a registered inspection part may be searched for which its point is inside the focus region. If such a registered inspection part is found, it may be matched to the corresponding reference part. If such a registered inspection part is not found or if the types of the parts differ, an incorrect part error may be determined to have been found, for example, either in the form of a missing part error or in the form of a wrong part error. If the parts are of the same type but have different orientations, a part orientation error is found. Conversely, if a part is detected that is not inside of any focus region then an incorrect part error in the form of an "obsolete part" is found.

At 1320, a second checking sub-operation may be performed in which several lengths are measured and measurement errors are checked. In the present example, the following measurements are estimated: total height and width of the inspection object 100 and height and width of each horizontal channel.

Depending on the type of reference object in question, an algorithm may be performed that takes advantage of certain specifics of the reference object in question. In the exemplary case of composite construction objects such as support structures, such specifics may include that a structure is flat in a X-plane. Thus, for example, if a pixel-to-mm scaling factor is estimated on the plane, this scaling factor can be applied to pixel measurements between points on the plane to estimate the real-world dimensions of the structure. Hence, a predetermined accuracy (e.g., within a few centimeters or even within a few millimeters) may be achieved even despite imaging errors like lens distortions, limitations on pixel granularity, or the like.

At 1322, a scaling factor computing operation may be performed which involves computing, for example, a pixel-to-mm scaling factor or another scaling factor for scaling from pixels to a real-world measure for the registered inspection image 310.

In one embodiment, the computation may follow a hierarchy of heuristics depending on whether a characteristic property of at least one inspection part is available. An example of such a characteristic property may be the presence of a mark having known dimensions. The mark may be, for example, a QR code, a bar code, a text label, or another type of mark. If, for example, BIM data or CAD data are available, then a known dimension of one of the reference parts of the reference object 200 may also be used. In that case, the type of object may be considered as characteristic property.

Hence, in a first iteration, the registered inspection image 310 may be scanned for such a mark. If the mark is found, the scaling factor can then be computed directly by relating a dimension of the mark, measured in pixels, to the corresponding known dimension in mm. If no mark is found, any one of the previously registered parts (e.g., a connector or an angular element), may be employed in a similar manner as long as at least one real-world dimension is known.

At 1324, an edge finding operation is performed which includes identifying x and y values of outer edges of the registered inspection object. This may be performed, for example, using a heuristic approach based on recognized parts. In one embodiment, the edge finding operation may include or be supplemented with re-running a part detection algorithm similar to the one performed during the recognizing operation 1100 on the registered image 310. Re-running the part detection algorithm may provide substantially more accurate results.

In operation 1324, the left edge of the inspection object may be estimated as the minimum x value among all recognized channels and the right edge may be estimated as the maximum x value among these channels. Analogously, a top edge may be estimated as a maximum y value of all channels.

In some cases, these heuristic approaches may not be applicable for estimating an actual bottom edge due to the perspective of the inspection image 110. To address this, a further characteristic of the composite construction objects under consideration may be taken into account, e.g., the fact that each composite construction object has a base element at its bottom. Hence, a "bottom point" estimation may be calibrated for the location of a bottom of the true inspection object for each possible base element/orientation pair as a percentage distance from the top of a bounding box of the base element. In this context, the y-coordinate may be considered for finding the true bottom edge.

At 1326, a specific part identifying operation may be performed which involves identifying parts specific to the measurements to be estimated and/or to the type of inspection objects 100 under consideration. In the present example of composite construction objects and according to the measurements to be estimated, the lowest horizontal channels are identified, again using a heuristic approach.

First, a set of interior registered parts is identified by filtering out all parts that are above base elements, in the sense that the x-coordinates of one or more points of the registered part fall inside a predetermined band pertaining to each base element. Such a band may be, for example, plus and minus 10% of the width of each base element.

Then, a set of candidate horizontal channels is identified by filtering out non-channel parts from the set of interior registered parts.

Horizontal channels are then identified among the set of candidate horizontal channels. This may be accomplished, for example, by looping over each candidate horizontal channel and removing it from the set of candidates if there is a horizontal channel above it, in the sense that any other candidate horizontal channels have one or more points with x-coordinate(s) inside the band formed by the x-coordinates of the left and right sides of this candidate horizontal channel.

At 1328, a measuring operation is performed which includes computing the height of each of the horizontal channels previously identified as the distance from the bottom y-coordinate to the bottom edge of the inspection object 100. The width of the horizontal channel may be estimated, for example, as the distance between the points of the focus regions relating to connectors which connect that horizontal channel to, for example, vertical channels on its left and right side.

Pixel-wise distances may then be scaled by a/the scaling factor to provide real-world estimates of these measurements. Any measurements that significantly deviate (e.g., deviate by a predetermined amount) from expectations given and/or computed using the same or at least a similar algorithm on the reference image 110 may then be returned as measurement errors.

At 1330, a third checking sub-operation may be performed which includes zooming into regions of the registered inspection image 310 and running them through a zoomed error detection unit (ZEDU, or zoomed error detector) to detect the remaining possible error types. e.g., fixing element errors, gap errors, alignment errors, and/or other types of errors. The zoomed error detection unit may include, for example, a further deep convolutional neural network. Zooming on such regions may allow the full detail of the registered inspection image 310 to be used.

At 1332, a zoomed error checking operation may be performed which includes the ZEDU checking each focus region that was constructed from an angular element or a base element. Other focus regions (e.g., constructed from one or more channels) may be skipped as none of the remaining error types may occur therein.

The ZEDU may be configured to detect gap errors, alignment errors, fixing elements and fixing element errors, and/or other errors or features. Gap errors and alignment errors are visually distinct, so it is possible to directly check for these. Fixing element errors may be detected using additional preprocessing. For example, fixing elements may be recognized first. Then, the recognized fixing elements may be checked for errors. In one embodiment, checking for fixing element errors may not require checking a position of a fixing element within a part for errors.

In one embodiment, the ZEDU may comprise an FRCNN architecture similar to the one described in relation to the recognizing operation 1100, but with a different final layer for the error classes being detected. The default anchor box aspect ratios may also be adapted to the zoomed analysis, since errors tend to relate to rectangular regions where one side is generally no more than twice the length of the other side.

In the present example, 21 error classes may be detected: eight gap error classes, eight alignment error classes, and five fixing element classes. As an example, two of the eight gap error classes relate to gaps on a left side or, respectively, on a right side between two channels perpendicular to each other and where a background is visible. The fixing element classes primarily differ in the direction the fixing element is facing. A different number or combination of error classes may be detected in another embodiment.

At 1336, setup of the zoomed error checking operation 1332 may be performed. This may involve training the ZEDU. In model training operation 1336, the ZEDU may be trained, for example, in a similar way to the one used to train the parts detection model as described in relation to the recognizing operation 1100, although the data augmentation method may be amended to further increase the size of the ZEDU dataset and, hence, to further improve overall model accuracy.

In one embodiment, for data augmentation horizontal flips may be applied to all or a selected sub-group of the training images, whereas vertical flips and/or vertical and horizontal flips may be applied in a manner limited to those images for which it makes sense. For example, training images containing base elements need not be flipped vertically, as an upside-down base element is expected to never be out-of-sample. Avoiding such non-realistic training data may also keep or increase recognition accuracy.

At 1334, a fixing element counting operation may be performed to count fixing elements contained in each focus region. For purposes of detecting fixing element errors, fixing elements in each focus region should be correctly detected. That said, in some cases it may not be sufficient to simply count the number of fixing elements detected within a focus region, because it is possible for the registered inspection part in one or more neighboring focus regions to be partially visible in the focus region. In such a case, a scenario may be created where the correct number of fixing elements is detected in a focus region, but there are still missing fixing elements and an error is not returned because another fixing element of the other registered inspection part is counted twice.

To prevent multiple counts, any fixing element is filtered out that is not inside the detected registered inspection part. In one embodiment, the term "inside" may include the case where the centroid of the fixing element is within the bounding box corresponding to the registered inspection part. But this is just an example. In other embodiments, the term "inside" may include a different meaning, e.g., any or a certain part of the fixing element is within the bounding box corresponding to the registered inspection part.

The number of fixing elements in the registered inspection image 310 is then compared to a given number or to the corresponding number of the reference image 210 computed, for example, in a similar way as for the inspection image 110.

Figure 19:
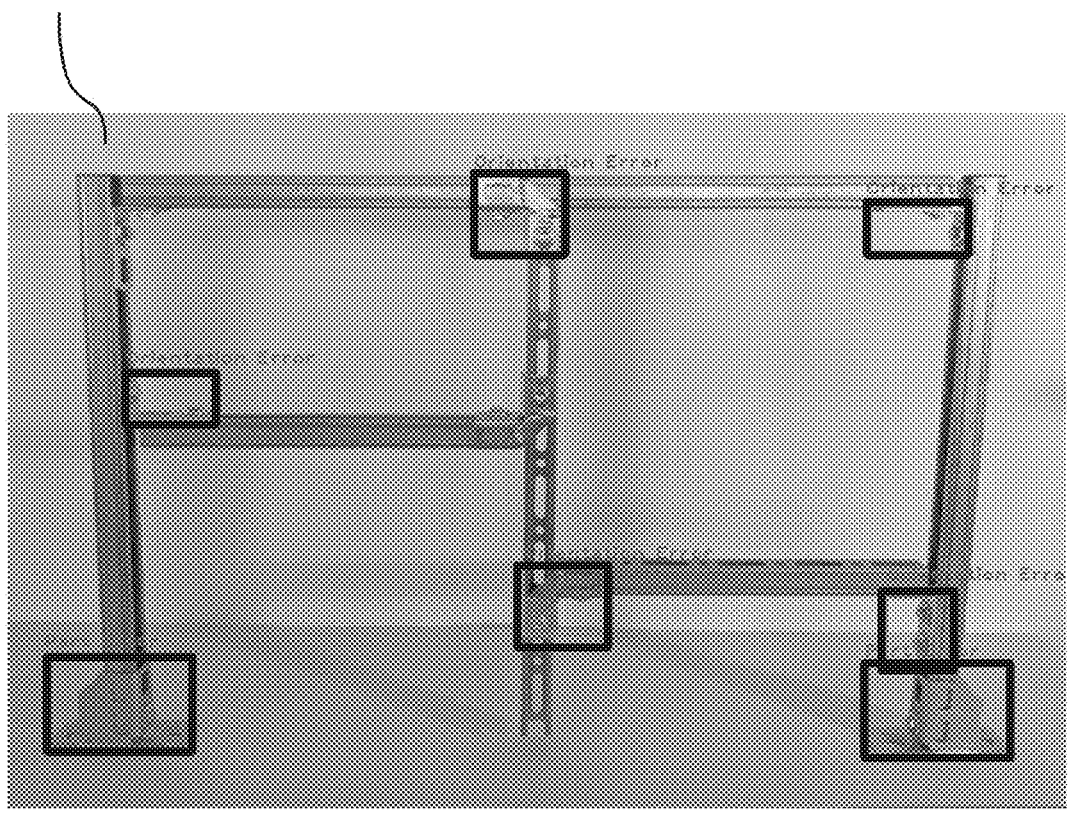
FIG. 19 shows a registered image with error-marking labels.

At the end of the inspection method 1000, all errors found may be compiled, for example, as structured data or as annotations on the registered input image. As an example, FIG. 19 shows an example of an annotated registered inspection image 310 comprising several error-marking labels for errors found during an inspection.

Figure 20:
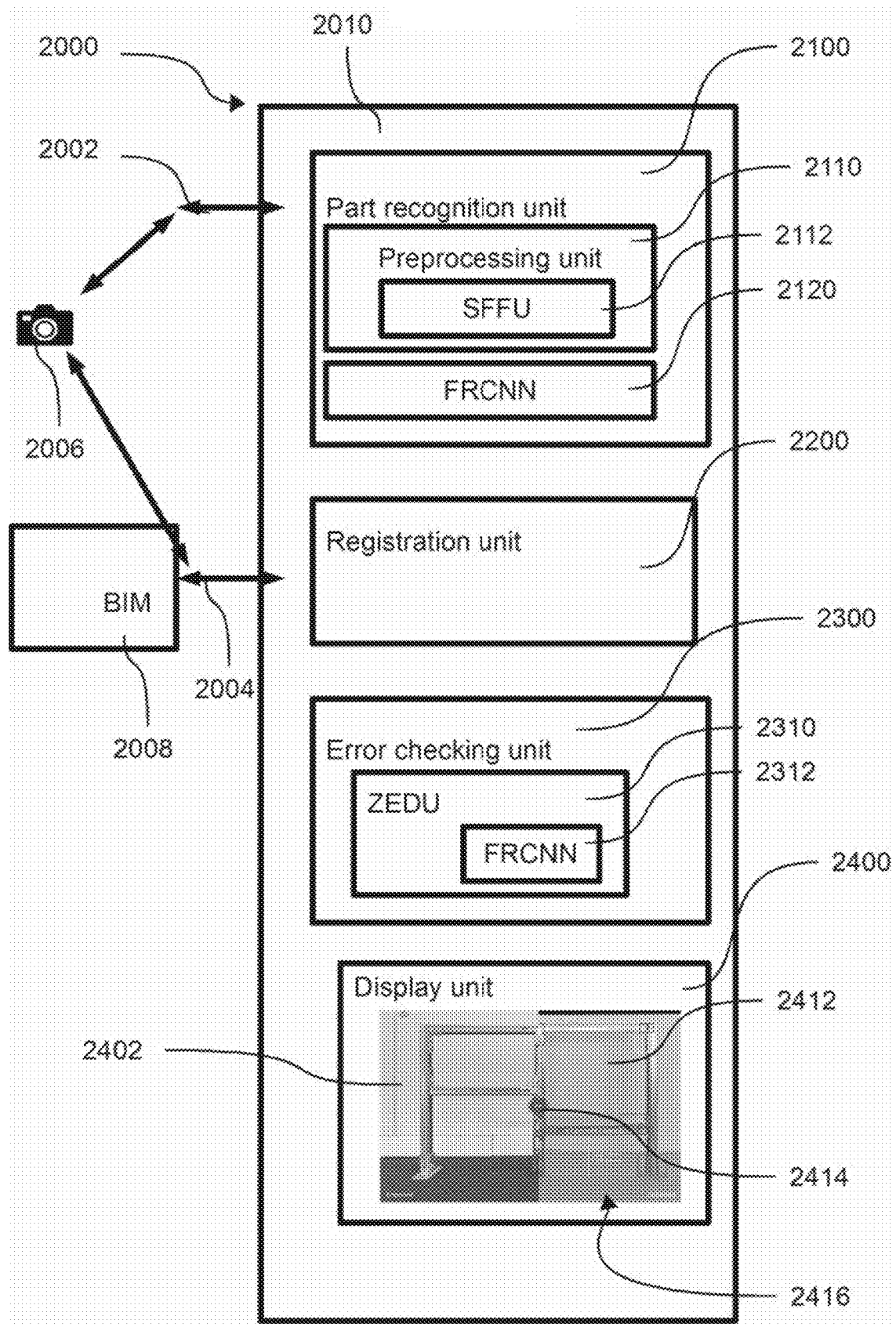
FIG. 20 shows a block diagram of a machine vision system.

FIG. 20 shows a block diagram of an embodiment of a machine vision system 2000. The machine vision system 2000 is configured to implement the previously described system and method embodiments described herein.

In one embodiment, the machine vision system 2000 may be configured to inspect an inspection object, for example a composite construction object such as, but not limited to, the inspection object 100 shown in FIG. 1. The inspection object 100 comprises a plurality of inspection parts, e.g., a plurality of construction parts including vertical channels 112, horizontal channels 114, and/or connectors 116.

In operation, the machine vision system 2000 is configured to compare an inspection image 110 of the inspection object 100 to a reference image 210 of the reference inspection object 200. The machine vision system 2000 or at least some of its corresponding logic may preferably be implemented in the form of a portable computing system. Examples include a tablet computer or a smartphone. At least a part of it may also be implemented as part of and/or using a distanced or "cloud" computing system.

The machine vision system 2000 comprises an inspection data interface 2002 for acquiring the inspection image 110 and a reference data interface 2004 for acquiring the reference image. The inspection data interface 2002 and/or the reference data interface 2004 may be implemented as a wired or a wireless data bus. They may be implemented either as separate physical entities or as one and the same physical entity.

A camera system 2006 is connectable to the inspection data interface 2002 or to the reference data interface 2004. The camera system 2006 may be used to acquire images of the inspection object 100 and/or the reference object 200, so that that images may be transferred to the machine vision system 2000 as the inspection image 110 and reference image 210 (if acquired by the camera system 2006), respectively, via the inspection data interface 2002 or the reference data interface 2004. The camera system 2006 may comprise an color image sensor. It may also comprise a depth image sensor.

BIM model data may be stored in a BIM model memory unit 2008, so that if the reference image 210 is given as BIM model data, these BIM model data may be transferred to the machine vision system 2000 via the reference data interface 2004.

The machine vision system 2000 further comprises a computing unit 2010, which comprises at least one microprocessor unit, a program code memory for storing program code data to be executed on the microprocessor unit and data memory for storing other data like image data, computing results, etc. The microprocessor unit in combination with program code stored in the program code memory is configured to be or to behave, among others, as at least one neural network. In one embodiment, the at least one microprocessor unit may comprise a GPU and/or a tensor processing unit, which may or may not be part of a cloud computing system.

These hardware and software components are configured to build at least the following units of the machine vision system 2000:

A part recognition unit 2100 configured to recognize at least one inspection part in the inspection image 110 and at least one reference part in the reference image 210. The part recognition unit 2100 may execute the recognizing operation 1100 and may comprise a preprocessing unit 2110 configured for image processing according to the image preprocessing operation 1110. In one embodiment, the preprocessing unit 2110 comprises a semantic foreground filtering unit (SFFU) 2112 for executing the semantic foreground-background filtering operation 1112. Furthermore, the part recognition unit 2100 may comprise a FRCNN 2120 for implementing the part recognition algorithm.

A registration unit 2200 configured to register the inspection image 110 onto the reference image 210 using the at least one inspection part and the reference part and providing a set of registration data.

An error checking unit 2300 configured to check for at least one error using the inspection image 110, the reference image 210, and the set of registration data. In one embodiment, the error checking unit 2300 may be configured to execute the checking operation 1300 and may comprise a ZEDU 2310. The ZEDU 2330 is configured to execute the zoomed error checking operation 1330 and may comprise a FRCNN 2312, which is configured to recognize, among others, fixing elements. It is trained according to the model training operation 1336.

The machine vision system 2000 further comprises a display unit 2400 having a display 2410 (e.g., a touch screen) and a sliding button 2414. The sliding button 2404 may be formed as virtual button presented on the display 2410. The button may be movable, for example, from left to right.

The machine vision system 2000 is configured to display results of an inspection on the display 2410. In one embodiment, the machine vision system 2000 may be configured to present an overlaid image 2416 constructed from areas of the registered inspection image 310 and the reference image 210. The proportions of the areas may depend, for example, on the position of the sliding button 2414. In this case, by moving the sliding button from left to right, or from right to left, a user may switch from one image to the other, thus facilitating a further visual analysis of errors found during the inspection.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, decoders, drivers, and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, drivers, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit. For example, the processor may comprise hardware forming and/or comprising a control logic, a readable and/or writable memory, a data interface, program code stored or storable in the memory and executable on the processor, in particular the control logic.

When implemented in at least partially in software, the controllers, processors, devices, modules, units, multiplexers, generators, logic, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although the present invention has been described herein with reference to a number of illustrative embodiments, it should be understood that numerous other modifications and embodiments can be devised by those skilled in the art that will fall within the spirit and scope of the principles of this invention. Reasonable variations and modifications are possible in the component parts and/or arrangements of the subject combination arrangement within the scope of the foregoing disclosure and the drawings without departing from the spirit of the invention. In addition to variations and modifications in the component parts and/or arrangements, alternative uses will also be apparent to those skilled in the art.

What is claimed:

1. An inspection method, comprising:
   comparing an inspection image of an inspection object to a reference image of a reference object;
   recognizing at least one inspection part in the inspection image and at least one reference part in the reference image, wherein the inspection part and the reference part correspond to each other;
   registering the inspection image onto the reference image using the inspection part and the reference part and providing a set of registration data, and
   checking for at least one error using the inspection image, the reference image, and the set of registration data.

2. The inspection method according to claim 1, wherein at least one of the inspection part or the reference part is recognized using a neural network.

3. The inspection method according to claim 1, wherein the registering comprises:
   performing a homography estimation based on at least one reference base point derived from the reference part and at least one inspection base point derived from the inspection part.

4. The inspection method according to claim 1, wherein the at least one error comprises at least one of an incorrect part error, a part orientation error, an alignment error, a fixing element error, or a measurement error.

5. The inspection method according to claim 1, wherein:
   the inspection object is or corresponds to a composite construction object,
   the composite construction object comprises a plurality of inspection construction parts,
   the reference object is or corresponds to a reference composite construction object, and
   the reference composite construction object comprises a plurality of reference construction parts.

6. The inspection method according to claim 5, wherein the reference image comprises at least one of BIM data, CAD data, or a set of construction parts data.

7. The inspection method according to claim 5, wherein checking for the at least one error comprises:
   searching for presence of at least one characteristic property,
   wherein the characteristic property includes a characteristic corresponding to a class of construction objects which the reference composite construction object belongs to.

8. The inspection method according to claim 7, wherein the characteristic property is or at least comprises a horizontal or at least essentially horizontal construction part.

9. The inspection method according to claim 5, further comprising:
computing a scaling factor for an element having known dimensions, and
searching for the element having the known dimensions in the inspection image based on the scaling factor.

10. The inspection method according to claim 9, wherein the element having the known dimensions is or at least comprises at least one of a fiducial, a mark, or a tag.

11. The inspection method according to claim 1, wherein checking for the at least one error comprises:
defining a focus region based on a reference part, and
comparing at least one inspection part being inside the focus region to the reference part.

12. The inspection method according to claim 11, further comprising:
checking whether at least one inspection part inside the focus reason has at least one of an incorrect part error or a part orientation error.

13. The inspection method according to claim 11, further comprising:
analyzing the focus region using a neural network.

14. The inspection method according to claim 11, wherein checking for the at least one error comprises searching for at least one fixing element within the focus region.

15. The inspection method according to claim 14, wherein checking for the at least one error comprises counting fixing elements within the focus region.

16. The inspection method according to claim 1, further comprising:
presenting an overlaid image containing at least an area of the inspection image and at least an area of the reference image.

17. The inspection method according to claim 16, wherein the overlaid image comprises at least one error-marking label.

18. The inspection method according to claim 17, further comprising:
modifying a visibility of at least one of the areas of the inspection image or the reference image based on information received from a sliding button.

19. A machine vision system configured to inspect an inspection object comprising a plurality of inspection parts, the machine vision system comprising:
an inspection data interface configured to acquire an inspection image of the inspection object;
a reference data interface configured to acquire a reference image; and
at least one processor configured to compare an inspection image of the inspection object to a reference image of the reference object, the at least one processor comprising:
a part recognizer configured to recognize at least one inspection part in the inspection image and at least one reference part in the reference image,
registration logic configured to register the inspection image onto the reference image using the inspection part and the reference part and to provide a set of registration data, and
an error checker configured to check for at least one error using the inspection image, the reference image, and the set of registration data.

20. The machine vision system according to claim 19, wherein the error checker is configured to check for at least one of an incorrect part error, a part orientation error, an alignment error, a fixing element error, or a measurement error.

21. The machine vision system according to claim 20, wherein at least one of the part recognizer or the error checker comprises a neural network.

22. The machine vision system according to claim 21, wherein each of the part recognizer and the error checker comprise a neural network.

23. The machine vision system according to claim 21, wherein the neural network is configured to recognize a fixing element.

24. The machine vision system according to claim 21, wherein the neural network is configured to recognize a support structure element.

25. The machine vision system according to claim 19, further comprising:
a semantic foreground-filter configured to filter at least one of the inspection image or the reference image.

* * * * *